United States Patent [19]

Ulveing et al.

[11] Patent Number: 4,702,182
[45] Date of Patent: Oct. 27, 1987

[54] PROCESS AND APPARATUS FOR THE INJECTION BY PNEUMATIC MEANS OF METERED AMOUNTS OF PULVERULENT MATERIALS INTO A VESSEL WHICH IS UNDER VARIABLE PRESSURE

[75] Inventors: Leon Ulveing, Howald; Joseph Linden, Luxembourg, both of Luxembourg; Matthias Bohnet, Brunswick, Fed. Rep. of Germany; Georges Wies, Luxembourg; Raymond Mack, Colmar-Berg, both of Luxembourg

[73] Assignee: Paul Wurth S.A., Luxembourg

[21] Appl. No.: 893,407

[22] Filed: Aug. 5, 1986

[30] Foreign Application Priority Data

Aug. 5, 1985 [LU] Luxembourg ............................. 86.034

[51] Int. Cl.⁴ .............................................. F23D 1/00
[52] U.S. Cl. ................................ 110/347; 110/104 R; 406/155; 406/197

[58] Field of Search ............................ 110/347, 104 R; 406/155, 156, 195, 197

[56] References Cited

U.S. PATENT DOCUMENTS

| 1,871,853 | 8/1932 | Kennedy | 406/155 X |
| 4,250,816 | 2/1981 | Angevime et al. | 110/104 R |
| 4,373,451 | 2/1983 | Gardener et al. | 110/347 X |
| 4,570,552 | 2/1986 | Rachner et al. | 110/104 R X |

Primary Examiner—Edward G. Favors
Attorney, Agent, or Firm—Fishman & Dionne

[57] ABSTRACT

A pneumatic mixture which has a relatively high content of pulverulent materials in the propulsion air is formed in a single metering means. This mixture is propelled through a common primary pipe to a distribution head in which the mixture is divided into secondary currents which are delivered respectively to each of the injection points. A supercritical speed is imparted to the mixture in the distribution head.

29 Claims, 4 Drawing Figures

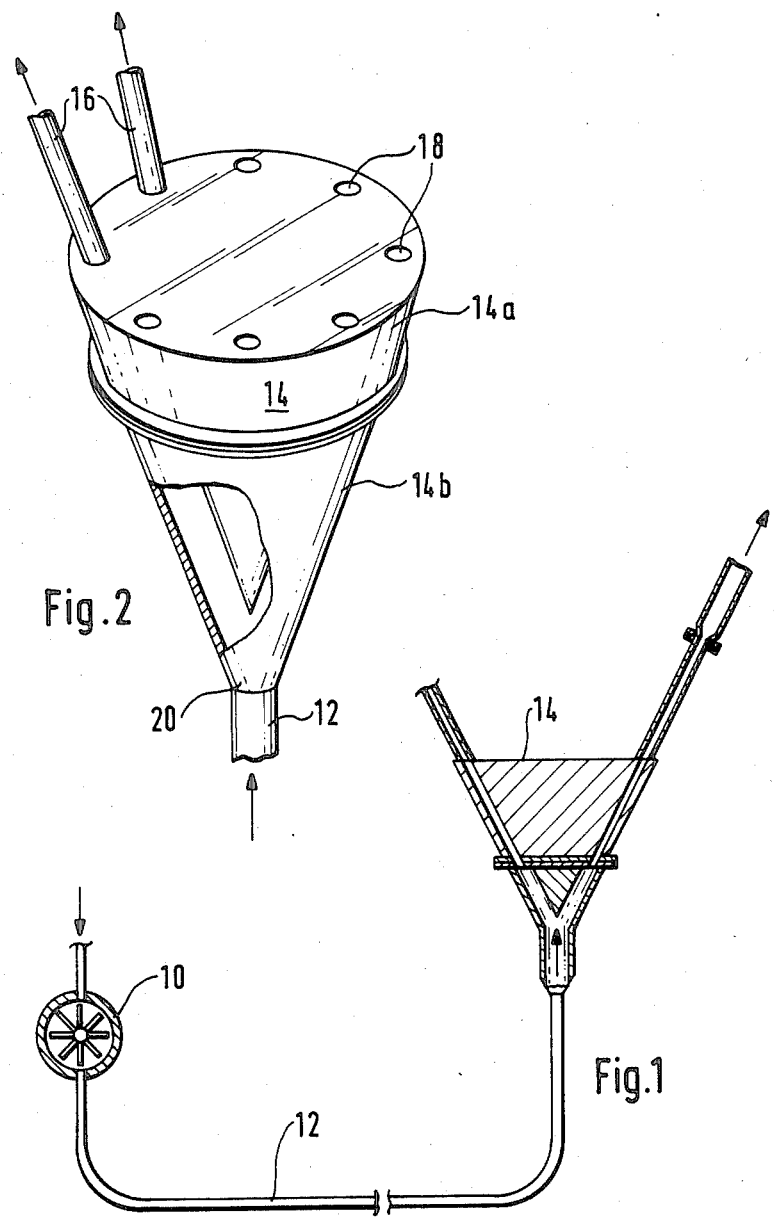

PROCESS AND APPARATUS FOR THE INJECTION BY PNEUMATIC MEANS OF METERED AMOUNTS OF PULVERULENT MATERIALS INTO A VESSEL WHICH IS UNDER VARIABLE PRESSURE

BACKGROUND OF THE INVENTION

This invention relates to a process for the injection, by pneumatic means, of metered amounts of pulverulent materials at different points into a vessel which is under variable pressure. As a result of this process, a pneumatic mixture is formed which has a relatively high content of pulverulent materials in the propulsion air. Also, a supercritical speed is imparted to the pneumatic mixture before it is injected into the vessel. This invention also relates to an apparatus for utilizing the above-described process.

German patent document DE-A-No. 33 25 901, corresponding to U. S. Pat. No. 4,570,552, assigned to the assignee hereof, the entire contents of which is incorporated herein by reference, proposed a process of the type hereinabove described wherein a pneumatic current is accelerated to supercritical speed, that is, the speed of sound, which varies in dependence on the density of the current. The acceleration of the pneumatic current to a supercritical speed has the advantage that the conditions of the flow upstream of the point where the supercritical speed is obtained are not influenced by the conditions of flow downstream of that point. This provides an important advantage in that it is no longer necessary to take into account the fluctuations of pressure and other variable parameters existing in the vessel into which the pulverulent materials are injected.

Although not limited to this application, the present invention will be described more particularly with reference to its preferred application, that is, the injection of solid fuels, such as powdered coal, into an industrial furnace, such as a blast furnace.

It is known that the base of the blast furnaces include a circular array of tuyeres, each of which receives hot air under pressure through blast pipes connecting the tuyeres to a circular hot air supply pipe. The solid fuels required for maintaining the reduction process in the furnace are generally injected directly into the tuyeres or the blast pipes.

The abovementioned U.S. Pat. No. 4,570,552 proposes to dispose the point where the pneumatic mixture is accelerated to supercritical speed at the location where injection of the pneumatic mixture is introduced into each blast pipe. Consequently, it is necessary to provide as many metering means as there are blast pipes, as well as individual pipes for carrying the mixture between each metering means and each blast pipe. However, taking into account the circular configuration of the blast furnace and its array of blast pipes, all the pipes carrying the mixture between the metering means and the blast pipes, or at least all the pairs of pipes, have different lengths. These different lengths obviously entail pressure drop differences which modify the conveying conditions from one pipe to another.

SUMMARY OF THE INVENTION

The present invention seeks to provide a new process and injection apparatus which enable this problem to be avoided, that is, which provides pneumatic conveying conditions which are easier to control upstream of the point of acceleration to supercritical speed. In order to attain this objective, the process of the present invention includes the formation of a pneumatic mixture in a single metering means. Thereafter, the formed mixture is propelled through a common primary pipe to a distribution head wherein the mixture is divided into secondary currents which are delivered, respectively, to each of the injection points. A supercritical speed is imparted to the mixture at the distribution head.

Two important features and advantages which result therefrom are that (1) only a single metering means is now required for feeding all the tuyeres of the furnace; and (2) the different lengths of pipe required for feeding the circular array of blast pipes are those of the secondary pipes (that is, between the point of acceleration to supercritical speed and the tuyeres.) As mentioned, the different conditions result from pipes of different lengths being positioned downstream of the acceleration to super critical speed. However, these conditions no longer affect conveying upstream of that point, particularly in the primary pipe between the metering means and the point of acceleration to supercritical speed. This point is positioned as close as possible to the furnace.

The apparatus for carrying out the process of the present invention comprises a distribution head having a pneumatic mixture admission opening connected through a primary pipe to a metering means. A plurality of internal ducts is provided; the number of ducts corresponding to the number of points where injection is effected into the vessel. These ducts diverge symmetrically from the region of the admission opening to a series of outlet openings connected respectively through secondary pipes to each of the points of injection into the vessel.

The lengths and sections of the internal ducts are determined with respect to the section of the primary pipe so that in the distribution head, the pressure drop required between the primary pipe and each of the secondary pipes for the acceleration of the mixture to supercritical speed is produced.

The above-described features and advantages of the present invention will be appreciated and understood by those skilled in the art from the following detailed description and drawings.

BRIEF DESCRIPTION OF THE DRAWINGS

Referring you to the drawings, wherein like elements are numbered alike in the several FIGURES:

FIG. 1 is a front elevation view, partly in cross section, illustrating the injection process in accordance with the present invention;

FIG. 2 is a perspective view of a distribution head in accordance with the present invention.

DESCRIPTION OF THE PREFERRED EMBODIMENT

Figure 3:
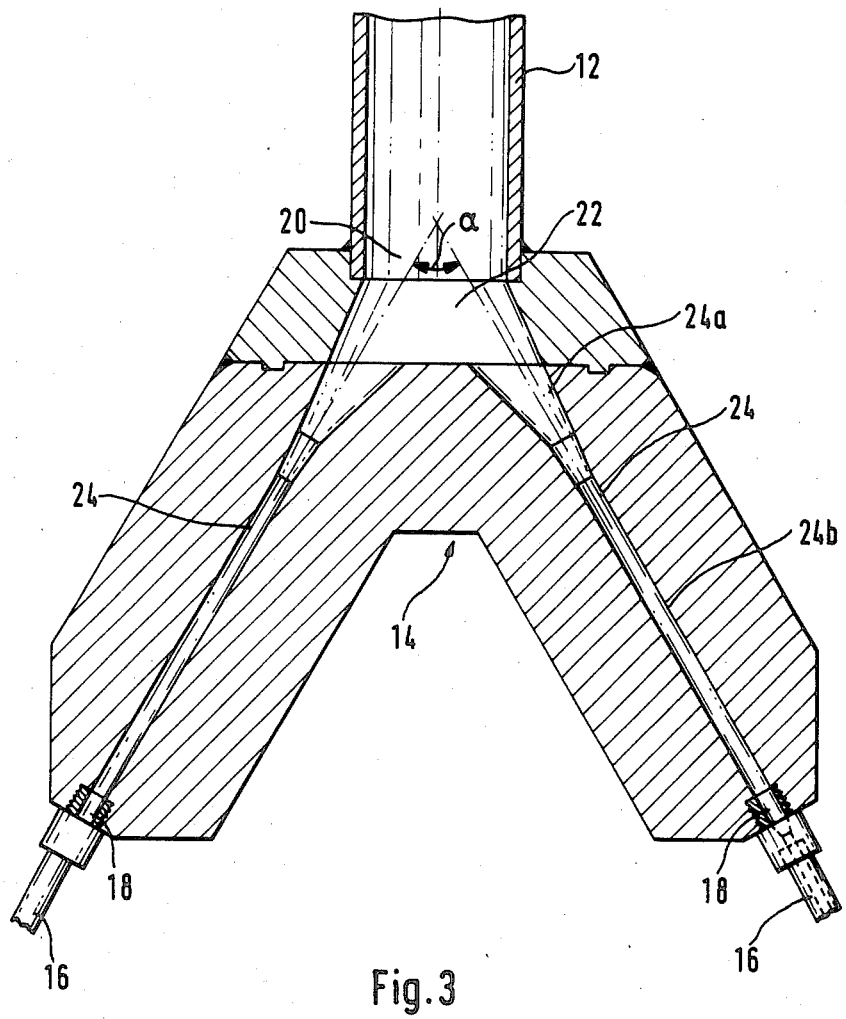
FIG. 3 is a cross-sectional elevation view through a first embodiment of a distribution head in accordance with the present invention.

Referring first to FIG. 1, a metering means is shown schematically at 10. Metering means 10 is designed to uniformly introduce predetermined amounts of pulverulent materials, for example powdered coal, into the pressurized air intended for pneumatic conveyance of the pulverulent materials. This mixture is conveyed through a primary pipe 12 to a distribution head 14 mounted in the immediate proximity of the vessel into which the pulverulent material is to be injected, (for example, a blast furnace). The distribution head 14 serves the dual function of (1) dividing the primary current into secondary currents, the number of secondary currents corresponding to the number of points of injection into the vessels; and (2) accelerating the pneumatic mixture to a supercritical speed. As a result, the conveying conditions in primary pipe 12 are not affected by either the conveying conditions in the secondary pipes or by the conditions existing inside the pressurized vessel.

As shown in FIG. 2, distribution head 14 has a generally conical shape, with the general appearance of a shower-bath rose. The base of distribution head 14 is provided with a circular series of outlet openings 18, each opening being connected to a secondary pipe 16. The apex of head 14 has an admission opening 20 connected to primary pipe 12. For ease of assembly, distribution head 14 may be manufactured in two parts 14a and 14b each part 14a, 14b being fastened to one another using appropriate seals or other means for rendering a fluid-tight connection.

As shown in FIG. 3, the interior of the distribution head 14 contains a series of ducts 24, which diverge symmetrically from a distribution chamber 22 facing the admission opening 20 to each of the outlet openings 18. Each of the ducts 24 comprises a convergent portion 24a immediately downstream of the distribution chamber 22, and a rectilinear portion 24b. The diameter of each of the ducts 24 is calculated in accordance with the section of the primary pipe 12, such that the pressure drop necessary for acceleration to supercritical speed is produced within the distribution head 14 or at its outlet. This pressure drop is generally determined in such a manner that the ratio between the pressure in the primary pipe 12 and that in each of the secondary pipes will be on the order of about 1.6 to about 2. The angle of divergence between two ducts 24 which are diametrically opposite one another is on the order of about 30°.

It is important that both distribution chamber 22 and the convergent portions 24a of the ducts 24 have an absolutely symmetrical configuration in relation to the longitudinal axis of the primary pipe 12, in order to obtain uniform distribution of the pulverulent material in the different ducts 24.

It is possible to add secondary air to the pneumatic mixture in order to "dilute" the mixture and improve conveying conditions. This secondary air may be added at the distribution chamber 22, at each of the ducts 24, or at the secondary pipes 16.

Figure 4:
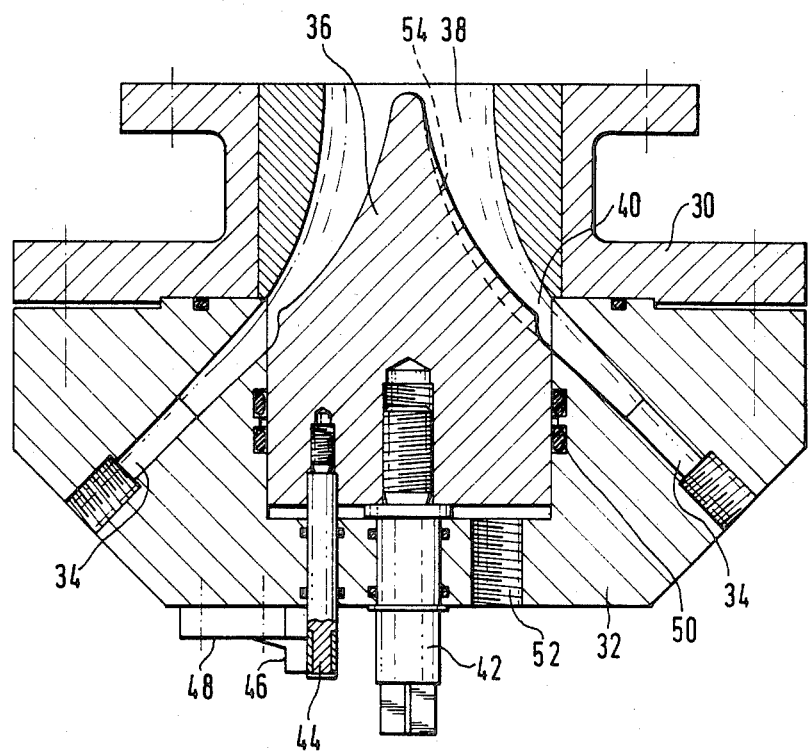
FIG. 4 is a cross sectional elevation view through a second embodiment of a distribution head in accordance with the present invention.

In FIG. 4, a preferred construction of a distribution head in accordance with the present invention is shown, which is made entirely by machining on a lathe. In contrast to the embodiment shown in FIG. 3, the embodiment of FIG. 4 has rounded internal contours in order to optimize conditions of flow. The distribution head shown in FIG. 4 comprises a top portion 30 and a bottom portion 32, which are attached to each other using screw fasteners or other suitable means to form a leaktight seal therebetween. The top portion 32 has a flange for connection to a primary pipe, while the bottom portion contains the divergent ducts 34 corresponding to ducts 24 in FIG. 3. As in the FIG. 3 embodiment, ducts 34 are adapted to be connected to the secondary pipes.

Bottom portion 32 has a central cylindrical bore which houses a distribution cone 36. Cone 36 has a tapered tip which extends into upper portion 30 and which, together with the inside wall of the latter, defines a passage 38 having an annular section. Passage 38, which extends between the primary pipe and the inlets of each of ducts 34, ensures uniform distribution of the mixture to each of the ducts 34. The base of the cone 36 forms (at the inlet of the ducts 34, and in relation to the latter), an annular constriction 40 with the inner edge of top portion 30. Constriction 40 effects the acceleration of the pneumatic mixture to supercritical speeds.

The profile of cone 36 and inner wall of top portion 30 is made such that the surface of the annular horizontal section of passage 38 diminishes progressively from the tip of the cone 36 to the constriction 40, (or at most remains constant).

In the embodiment shown in FIG. 3, the conveying conditions, particularly the rate of flow of the pulverulent material, are typically regulated by the addition of secondary air. However, in FIG. 4, the regulation of the conveying conditions is effected through axial mobility of cone 36. To achieve this, cone 36 is axially movable under the control of a displacement mechanism 42, (such as, for example, a screw mechanism), moving it between the position shown in FIG. 4 and more open positions through the lowering of cone 36 to the bottom of its housing.

A position indicator 44 enables the position of cone 36 to be indicated visually on the outside thereof. Indicator 44 may, for example, be of the type in which the axial displacement of cone 36 is converted into the rotation of a rod and a pointer 46 pivoting in front of a dial.

A fluid tight seal around movable cone 36 is achieved by means of packings 50. In addition, this fluid tight seal may be improved, by an injection of gas under pressure countercurrently through an opening in bottom portion 32.

In order to improve the distribution of the pulverulent material in passage 38, rounded grooves, which are represented schematically by the broken line 54 may be provided on cone 36 in line with each of the ducts 34. The depth of the grooves will decrease progressively from the constriction 40 to the apex of the cone 36.

In order to reduce the risk of clogging at the inlets of ducts 34, in a modification of the embodiment shown in FIG. 4, it is possible to turn the cone 36 slowly about its axis. However, in that case, it will be necessary to adapt the mechanism 42 and the indicator 44 to permit accordingly.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A process for the injection by pneumatic means of metered amounts of pulverulent materials at different injection points into a vessel which is under variable pressure including the steps of:
   forming a pneumatic mixture in metering means;
   delivering said formed pneumatic mixture through a common primary pipe to a distribution head;
   imparting a supercritical speed to said pneumatic mixture in said distribution head wherein a pneumatic mixture is formed which has a relatively high content of pulverulent material in the propulsion air; and dividing said pneumatic mixture into secondary currents which are delivered respectively to a plurality of injection points.

2. An apparatus for the injection by pneumatic means of metered amounts of pulverulent materials at different injection points into a vessel which is under variable pressure comprising:

metering means for forming a pneumatic mixture;

means for delivering said formed pneumatic mixture through a common primary pipe to a distribution head means;

means for dividing said pneumatic mixture into secondary currents which are delivered respectively to a plurality of injection points, said dividing means being provided in said distribution head means;

means for imparting a supercritical speed to said pneumatic mixture in said distribution head means whereby a pneumatic mixture is formed which has a relatively high content of pulverulent materials in the propulsion air.

3. The apparatus of claim 2 wherein said distribution head means comprises:

a pneumatic mixture admission opening connected through said primary pipe to said metering means;

a plurality of internal ducts, the number of internal ducts corresponding to the number of points where injection is effected into the vessel, said ducts diverging symmetrically about said admission opening to a series of outlet openings connected respectively through secondary pipes to each of the points of injection into the vessel.

4. The apparatus according to claim 3 including:

a distribution chamber disposed downstream of said admission opening and upstream of each of said internal ducts.

5. The apparatus according to claim 3 wherein each of said ducts comprises:

a convergent portion and a rectilinear portion.

6. The apparatus according to claim 4 wherein each of said ducts comprises:

a convergent portion and a rectilinear-portion.

7. The apparatus according to claim 2 wherein:

said pulverulent material comprises powdered coal.

8. The apparatus according to claim 2 wherein:

said vessel is a shaft furnace.

9. The apparatus of claim 3 wherein selected pairs of said internal ducts are located at diametrically opposite positions and wherein:

the angle of divergence between a pair of diametrically opposed ducts is about 30 degrees.

10. The apparatus of claim 3 wherein said distribution head means further comprises:

a first member having said plurality of ducts therein and a central housing communicating with said ducts;

a second member having an opening therethrough communicating with said primary pipe, said first and second members cooperating with one another to form a fluid tight connection therebetween with said central housing being aligned with said opening;

distribution cone means having a tip at one end and a base at an opposed end in said central housing of said first member, said tip of said cone means extending into said opening of said second member wherein said cone means and said opening cooperate to define an annular passage having a predetermined cross section, said passage extending from said tip of said cone means to said plurality of ducts.

11. The apparatus of claim 10 including:

means for axially displacing said cone means for adjusting said cross section of said annular passage.

12. The apparatus of claim 10 wherein:

said cross section of said passage is substantially constant.

13. The apparatus of claim 10 wherein:

said cross section of said passage decreases progressively in the direction of said ducts.

14. The apparatus of claim 11 including:

means for indicating the axial position of said cone means.

15. The apparatus of claim 10 wherein said cone means has an outer surface and including:

grooves on said outer surface in alignment with each of said ducts.

16. The apparatus of claim 15 wherein said grooves have a depth and wherein:

said depth of said grooves progressively decrease from said base to said tip of said cone means.

17. The apparatus of claim 10 including:

fluid tight sealing means between said cone means and said central housing.

18. The apparatus of claim 10 wherein:

said cross-section of said passage at said base of said cone means defines an annular constriction for accelerating said pneumatic mixture to supercritical speeds.

19. The apparatus of claim 18 wherein:

said cross section of said passage decreases progressively in the direction of said ducts.

20. An apparatus for distributing a pneumatic mixture of pulverulent materials to different injection points of a vessel which is under variable pressure comprising:

a first member having a plurality of symmetrically spaced diverging distributing ducts therein and a central housing communicating with said ducts;

a second member having an opening therethrough, said first and second members cooperating with one another to form a fluid tight connection therebetween with said central housing being aligned with said opening;

distribution cone means having a tip at one end and a base at an opposed end in said central housing of said first member, said tip of said cone means extending into said opening of said second member wherein said cone means and said opening cooperate to define an annular passage having a predetermined cross section, said passage extending from said tip of said cone means to said plurality of ducts; and means for axially displacing said cone means for adjusting said cross section of said annular passage.

21. The apparatus of claim 20 wherein:

said cross section of said passage is substantially constant.

22. The apparatus of claim 20 wherein:

said cross section of said passage decreases progressively in the direction of said ducts.

23. The apparatus of claim 20 including:

means for indicating the axial position of said cone means.

24. The apparatus of claim 20 wherein said cone means has an outer surface and including:
    grooves on said outer surface in alignment with each of said ducts.

25. The apparatus of claim 24 wherein said grooves have a depth and wherein:
    said depth of said grooves progressively decrease from said base to said tip of said cone means.

26. The apparatus of claim 20 including
    fluid tight sealing means between said cone means and said central housing.

27. The apparatus of claim 20 wherein:
    said cross-section of said passage at said base of said cone means defines an annular constriction for accelerating said pneumatic mixture to super critical speeds.

28. The apparatus of claim 27 wherein:
    said cross section of said passage decreases progressively in the direction of said ducts.

29. The apparatus of claim 20 wherein selected pairs of said ducts are located at diametrically opposite positions and wherein:
    the angle of divergence between a pair of diametrically opposed ducts is about 30 degrees.

* * * * *